May 13, 1969

L. F. FRANK 3,443,869

V-GROOVED OPTICAL SYSTEM

Filed Jan. 12, 1966

Sheet _1_ of 4

INVENTOR
LEE F. FRANK

BY
ATTORNEYS

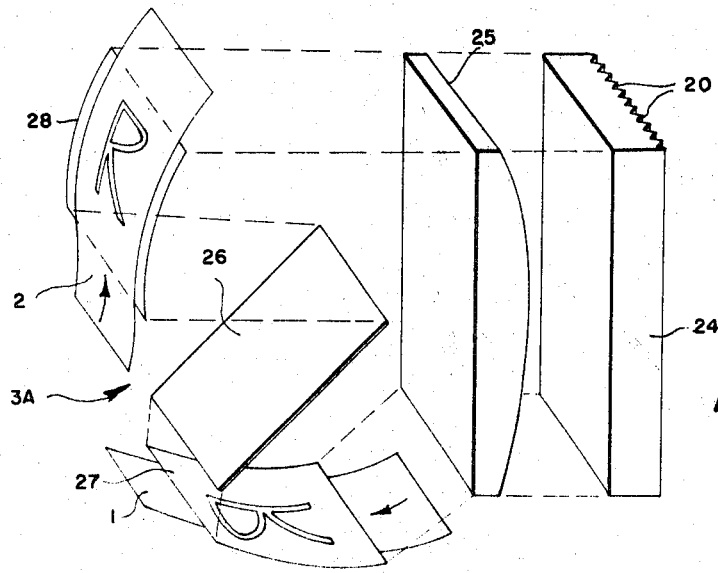
FIG. 3
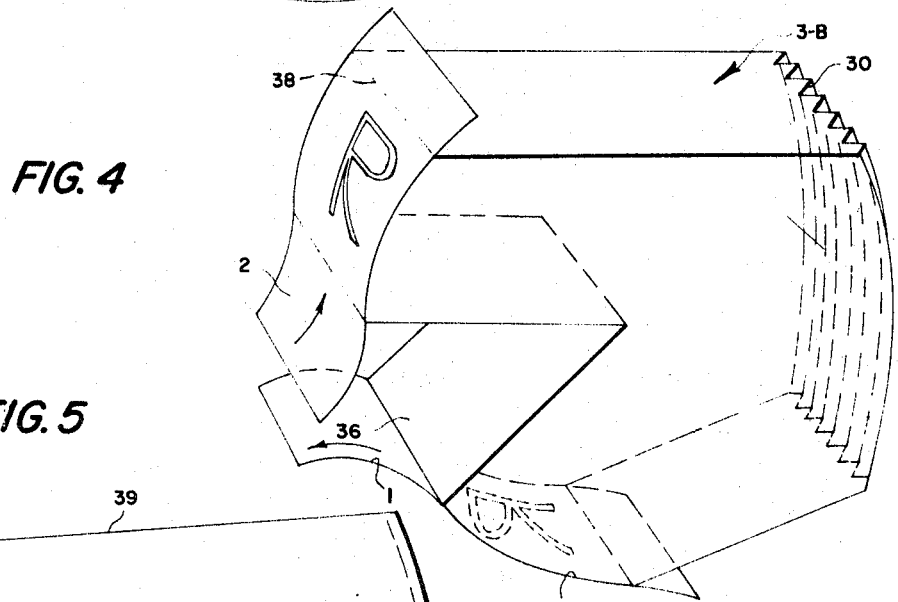
FIG. 4
FIG. 5
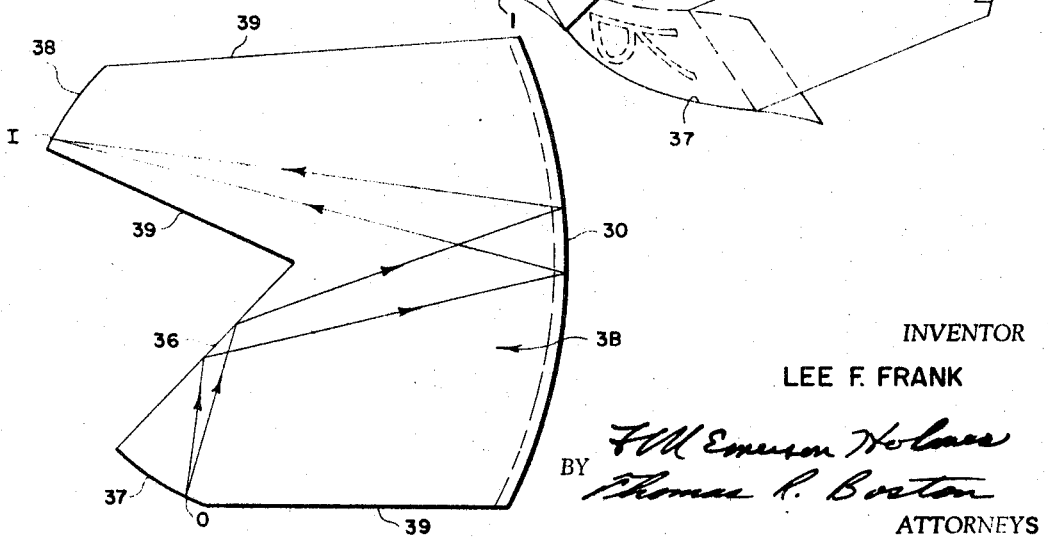
INVENTOR
LEE F. FRANK
ATTORNEYS May 13, 1969
L. F. FRANK
3,443,869
V-GROOVED OPTICAL SYSTEM
Filed Jan. 12, 1966
Sheet 3 of 4
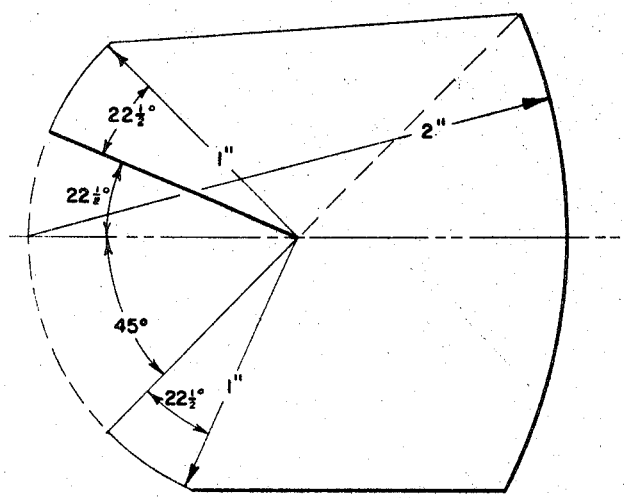
FIG. 6a
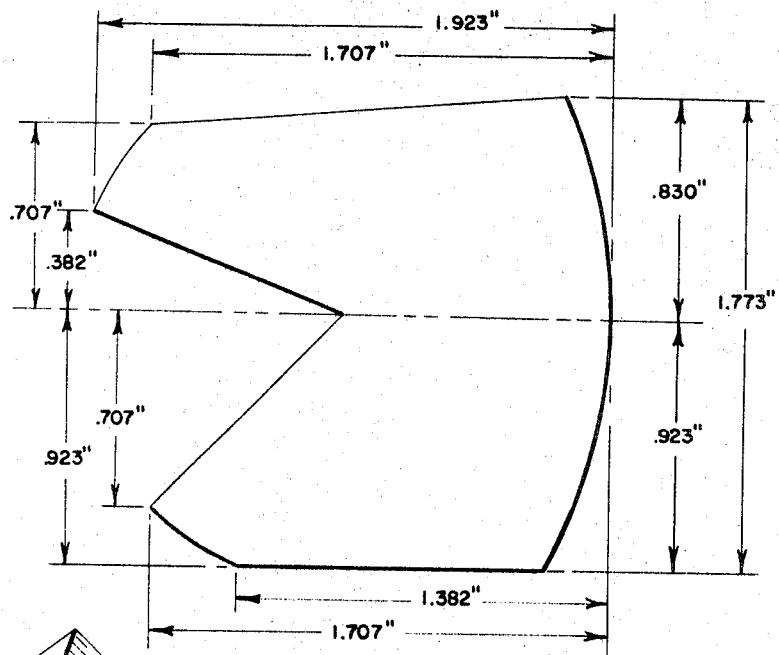
FIG. 6b
FIG. 7
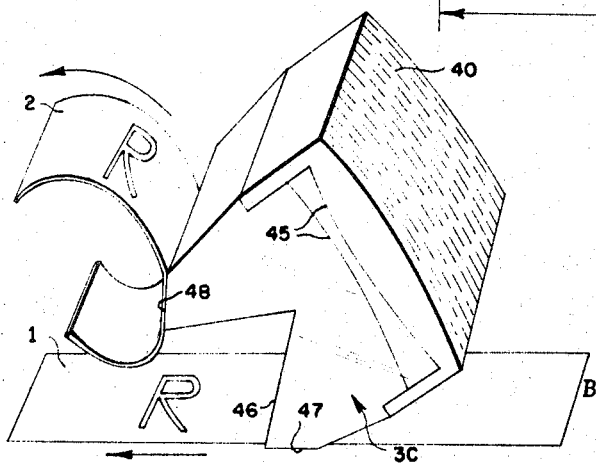
INVENTOR
LEE F. FRANK
BY
ATTORNEYS

United States Patent Office 3,443,869
Patented May 13, 1969

3,443,869
V-GROOVED OPTICAL SYSTEM
Lee F. Frank, Rochester, N.Y., assignor to Eastman Kodak Company, Rochester, N.Y., a corporation of New Jersey
Filed Jan. 12, 1966, Ser. No. 520,262
Int. Cl. G03b 27/54
U.S. Cl. 355—47                                   7 Claims

ABSTRACT OF THE DISCLOSURE

An optical device which receives light from a document plane, which can be flat or a cylindrically curved surface and located on an optical element or spaced therefrom, focuses this light onto an image surface which can also be on the optical elements or spaced therefrom and flat or curved. The optical device is particularly applicable to copiers that do not involve scanning. The device includes a 90° V-grooved reflecting surface which is effectively oblique to the optical axis so that the image formed by the grooved surface is to one side of, not superimposed on, the document plane. The grooves, which are located in planes parallel to the plane in which the image is offset from the object, image the light in a first azimuth which is at right angles to the offset image plane. Focusing of the light in a second azimuth is accomplished by having the longitudinal axes of the grooves cylindrically curved in planes parallel to the second azimuth, by having two cylindrically concave mirrors or by having a cylindrical lens, the axis of the cylinder, in each case being orthogonal to the plane in which the image is offset.

---

The present invention relates to optical projection systems. It relates particularly to an optical system for use in document copying.

Several terms used in describing the present invention are perhaps a little unusual and will, therefore, be defined.

A "right-reading" copy is one which looks the same as the original whereas a "wrong-reading" copy is a mirror image of the original, the copies being magnified, reduced, or of the same size, as the case may be. A wrong-reading copy on a transparent sheet appears right-reading when viewed through the sheet. A wrong-reading ink receptive copy or other transfer master can be and commonly is used as a printing plate.

Some document copying systems expose only a line of the sensitive material to a line of the document. Either the optical system moves or the document and the sensitive material move, so that the whole area of the document is scanned. In some scanning systems, the width of the line is the lower limit of resolution of the system. In this case, it does not matter whether the sensitive sheet moves synchronously with the image falling thereon or moves at a different rate or moves in the opposite direction. The optical system has to provide definition or "resolution" only along the line. Fiber optics are sometimes used for such single line scanning sometimes with the fibers crossed as in U.S. Patent 3,125,013, Herrick et al., to permit cocurrent scanning, as defined below. Single line scanning systems are usually inefficient since the scanning must be slow enough to expose each elemental area sufficiently. Other scanning systems have the scanning "line" or area appreciably wide so that part of the total image is within the scanning area and the sensitive material must move synchronously with the image (or the equivalent must take place if the optical system rather than the sensitive material, moves). Since the scanning area has a finite width, it is perhaps not quite proper to refer to such systems as "line scanning," but it is common to do so. There are two forms of such area scanning which require definition.

"Countercurrent scanning" refers to a system in which the document and the sensitive sheet move in effectively opposite directions when the image movement is synchronized with that of the sensitive sheet. When the document and sensitive sheet are parallel, with the optical system between them, countercurrent scanning results when they actually move in opposite directions. When they are at any orientation other than parallel, the movement is described as clockwise or counterclockwise and when both move clockwise or both move counterclockwise, the scanning is counter-current.

Similarly, if the document and sensitive sheet move in parallel planes in the same direction, or stay fixed and allow the optical system to move between them, or if one moves clockwise and the other one counterclockwise, the scanning is said to be co-current. Note that the movement in parallel planes in the same direction on opposite sides of the optical system has one sheet moving clockwise and the other counterclockwise with respect to the optical system. There is no need here to discuss variations in which the scanned areas are offset in the dimension parallel to both or in which one or both are oriented in some oblique or skew plane.

To provide a right-reading image on the surface receiving the light, either type of "area" scanner must include one lens and one reflector or an even number of lenses and reflectors. The use of an odd number of reflectors and lenses gives a wrong-reading image which must be viewed through the base or used as a transfer master. The present invention has to do primarily with countercurrent scanning systems giving right-reading images, or with co-current systems giving wrong-reading ones.

Optical systems have optic axes. The present invention distinguishes the two "azimuths" which are planes lying on the optic axis but at right angles to each other. That is, the azimuth's planes are at right angles to each other and are at right angles to the plane which is orthogonal to the optic axis. The present invention does not use "plate optics" but reference is made to U.S. Patents 3,060,805, Brumley and 3,060,806, Lewis et al., since they illustrate an optical system in which the light is controlled in one azimuth by one system (namely, parallel plates) and is controlled (focused) in the other azimuth by cylindrical lenses or mirrors.

The present invention also uses cylindrical lenses or mirrors or the equivalent for focusing the light in one azimuth. In the other azimuth, however, it uses a "ninety degree V-grooved surface." The azimuth using the V-grooves will be referred to as the first azimuth and that using the cylindrical lenses or mirrors as the second azimuth. Any dihedral reflector with a roof angle of 90° will return light directly on itself but shifted sideways less than the width of the dihedral reflector. Within the first azimuth it does not matter from what direction the light comes (within 45° of the bisecting plane of the dihedral) providing the light strikes both reflectors of the dihedral. The reflecting surfaces of the grooves can be metalized or, within an optical element, can be totally internally reflecting. In the latter case, the angle of acceptance is not so great since at greater obliquities the light passes through one or the other of the reflecting surfaces of the dihedral. In the present invention the ninety degree V-grooved surface has the individual grooves very narrow and juxtaposed, since in the first azimuth, this is the limit of the resolution of the system.

"$f$/aperture" is a convenient term to use since the invention works at different $f$/apertures in the two azimuths. With a total internally reflecting V-grooved system for controlling the light in the first azimuth, the maximum aperture is about $f/6$ or $f/8$ depending on the index of refraction. It is convenient to have the lens or mirror system in the other, or second azimuth operating somewhat higher. With a "totally" internally reflecting V-grooved surface, it is preferable to have a light "absorber" behind the V-grooved surface so that stray light which passes through the V-grooved surface is absorbed and not reflected back into the system.

The longitudinal axes of the ninety degree V-grooves may be straight lines or they may be on a cylinder with the axes of the grooves curved in planes orthogonal to the axis of the cylinder. As a matter of fact the grooves can be just like screw threads on a large cylinder, with a pitch of .01 to .005 inch, i.e., 100 to 200 grooves per inch in a preferred embodiment. Thus, the one surface can act both as the V-grooved surface to control light in the first azimuth and as a cylindrical reflector to focus light in the second azimuth. To provide the even number of reflectors and lenses required for a right-reading copy, the V-grooved reflector counts as two reflectors (whether their axes are straight or curved). The straight line V-grooved surface controls light only in the first azimuth using a cylindrical means for focusing in the other azimuth. When the axes of the V-grooves are cylindrically curved, they control the light in both azimuths. Thus, in each case one additional reflector (or other erector) is required as the third unit to make the number of units even. The additional reflector is omitted in co-current wrong-reading embodiments.

The primary object of the invention is to provide an optical system suitable for countercurrent scanning, particularly one which is comparatively inexpensive and mechanically sound. Fiber optics are relatively expensive. Plate optics operate at high apertures in both azimuths but are more expensive and introduce a line structure which is sometimes objectionable in the final print.

Other prior systems such as those involving reflex printing with the incident light passing through the sensitive sheet before it reaches the document to be copied, introduce or involve so much non-image light that the contrast is low. Some forms of plate optics also have a great deal of scattered light which degrades the contrast.

An object of a preferred embodiment of the present invention is to minimize the amount of scattered or non-image light.

All of the optics including the V-grooved surface can be molded and can consist of a single unit which minimizes costs and maintains rigidity.

A further object of the invention is to provide an optical scanning system which has a commercially acceptable scanning rate and produces a well defined high quality optical image with relatively low sensitivity photosensitive materials. The photosensitive material may be a photographic film or paper or may be a photoconductor such as a zinc oxide in resin coating on paper or on metal foil.

Thus, the object of the invention is to produce an inexpensive but accurate optical system producing adequate quality for right-reading countercurrent or wrong-reading co-current scanning.

According to the invention an optical system receives light from a document plane (which may be a flat or a cylindrically curved surface, and may be located on an optical element or spaced from the optical element) and focuses this light onto an image surface (which also may be on the optical element or spaced therefrom and may also be flat or curved). Since an area of finite width in both dimensions is imaged, the optical system is applicable to copiers that do not involve scanning. Nevertheless, the system is particularly well adapted for scanning, in which case, means are provided for moving the document past an illuminated area in the document plane and for simultaneously moving the sensitive sheet past the corresponding area in the image plane, synchronously with the image. The optical system includes a ninety degree V-grooved reflecting surface which is effectively oblique to the optic axis so that the image formed by the V-grooved surface is off to one side and not superimposed on the document area. The grooves, which are located in planes parallel to the plane in which the image is offset from the object, image the light in the first azimuth, which is at right angles to this image offset plane. The focusing of the light in the second azimuth is accomplished by having the longitudinal axes of the grooves cylindrically curved in planes parallel to the second azimuth, by having two cylindrical concave mirrors or by having a cylindrical lens, the axis of the cylinder in each case being orthogonal to the plane in which the image is offset.

Since the principle of the ninety degree V-grooved reflecting surface operates only at 1:1, (i.e., unit magnification) the whole system must be made to operate at this ratio. Therefore, the cylindrical lens or mirrors operating in the second azimuth must also work at exactly 1:1. Otherwise the image would be astigmatized.

Referring to the light in the first azimuth, light traveling from a point on the object at more than 45° to the optic axis would strike only one surface of a V-groove and would be scattered. Thus, metallized V-groove surfaces are not too satisfactory unless baffles or other means are provided to prevent the highly oblique light from coming back to the image plane. On the other hand, since such highly oblique light strikes the reflecting surfaces at about normal incidence, such light is not appreciably reflected by total internal reflection, but is transmitted harmlessly into the air behind. Thus, this embodiment is preferred, but requires a light absorber to absorb the transmitted light. Additional reflecting surfaces may be included in the optical system to provide a right-reading or a wrong-reading copy as desired.

The simplest form of the system, in which light passes to a cylindrically curved V-grooved system and directly back to an image plane, gives a wrong-reading image on sensitive paper. The same is true when a cylindrical lens is used in front of a flat V-grooved surface. An additional reflector is included when a right-reading copy is desired.

The operation of the invention and is various advantages will be more fully understood from the following description when read with the accompanying drawings in which:

FIG. 3 is a perspective, exploded view of the optical components of a first embodiment of the image forming element of the present invention;

FIG. 4 is a perspective view of a second embodiment of the image forming element;

FIG. 5 is a side schematic view of the image forming element of FIG. 4 showing some ray traces therethrough;

FIGS. 6a and 6b are side schematic views showing typical dimensions of the embodiment of FIG. 4;

FIG. 7 is a perspective view of a third embodiment of the image forming element.

Figure 1:
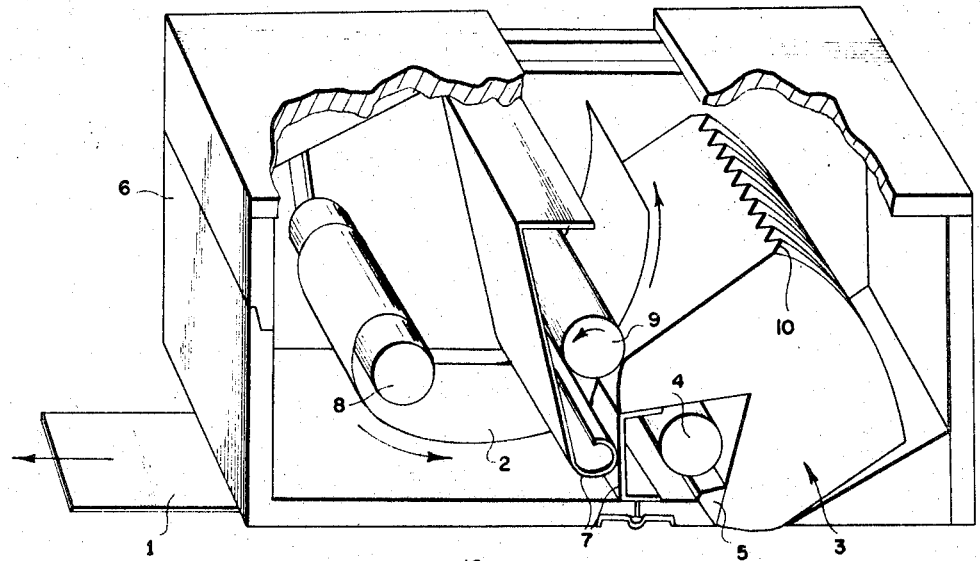
FIG. 1 is a perspective view of the internal arrangement of a duplicating device having a countercurrent scanner which uses an image forming element of the present invention.

Referring now to FIG. 1, a duplicating or copying device comprising an enclosure 6, which contains light baffles 7, a copy paper supply roll 8 and a feeding mechanism 9, is shown. The document 1 contains information which is to be copied onto the photosensitive copy material 2. The copying device uses a countercurrent scanner in which the optical element 3 serves to transfer an image light from the document 1 onto the photosensitive material 2. The information on the document 1 is thereby duplicated on the photosensitive material 2.

In the countercurrent scanner of FIG. 1 both the document 1 and the photosensitive material 2 are in motion relative to the optical element 3 during the exposure. The relative motions of the document 1, the photosensitive material 2 and the optical system 3 as shown in FIGS. 1, 3, 4, 7 and 9 provides a right-reading image on the photosensitive material 2. If the velocities of the document 1 and the photosensitive material 2 are the same relative to the optical element 3, the image remains in register with the photosensitive material 2 during the exposure. Any error in matching the relative velocities of the photosensitive material 2 and the document 1 decreases the resolution in the direction of scanning.

The document may be illuminated in a number of ways, such as by introducing the light from a light source 4 into the optical element by means of a triangular optical bar 5 cemented to the appropriate internal flat surface of the optical element. The illumination of the document is then independent of the opacity of the document 1 or the photosensitive material 2.

The optical element 3 of the countercurrent scanner comprises a cylindrical lens portion and a ninety degree V-grooved reflecting surface 10.

Figure 2:
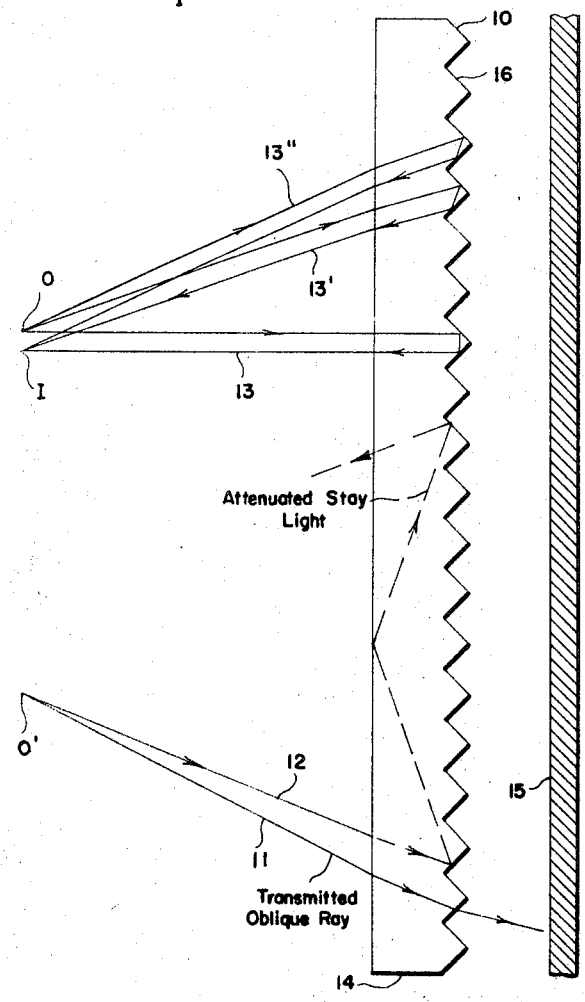
FIG. 2 is a top schematic view of the grooved portion of an image forming element showing some ray traces therethrough.

FIG. 2 illustrates the path of the light rays in the first azimuth, that which utilizes the 90° V-grooved surface to control the light. The sides of the grooves 16 form a dihedral reflector having a roof angle 90°. Such a reflector will return light directly on itself but shifted sideways less than the width of the dihedral reflector within the first azimuth. The distance by which the image is shifted in this azimuth depends upon the width of the grooves and the diffraction from the edges of the grooves. Both of these phenomena combine to define an optimum groove width for each image to object distance. Sample light rays from object point O to image point I in the first azimuth are shown at 13 in FIG. 2. This reflection of the light rays back upon themselves in this azimuth will occur for all light rays arriving at the dihedral reflecting surface and within 45° of the plane bisecting the dihedral roof angle and striking both reflectors of one dihedral. In FIG. 2 the more oblique light rays 13' and 13'' as well as 13 are directed back to the point I while oblique ray 12 does not strike both sides of a groove and therefore becomes a stray ray.

For purposes of the present invention, stray light rays that are not returned to the source must be suppressed. Examples of stray light rays 11 and 12 are shown emanating from object point O' in FIG. 2. These oblique rays will either be transmitted through one or the other of the reflecting surfaces as shown for ray 11, or reflected by only one of the two reflectors of the dihedral as a result of which it becomes a stray light ray as shown at 12 and which must be attenuated.

In order to control these oblique rays, the grooves are disposed on an unsilvered rear surface of an optical block having a high refractive index. Those oblique rays which are transmitted instead of reflected are then absorbed by a black surface or light absorbing body 15 in the air space behind the grooved surface. Alternatively, a light absorbing substance could be disposed immediately behind the grooved surface itself. Increasing the retractive index of the block 14 increases the obliquity of the rays which will be reflected.

The ray 12 in FIG. 2 illustrates a stray ray which strikes only one of the two reflecting surfaces of the dihedral. This oblique stray ray has a longer ray path in the grooved slab than does the image forming light rays 13. This ray is attenuated by a dye within the slab 14. Since the path of stray ray 12 within the slab 14 is much longer than that of image forming ray 13, it will be attenuated by the dye whereas the image forming light 13 having a relatively short path in slab 14, will not. Thus the dye in block 14 suppresses the residual stray light rays but has relatively little effect on the imaging light rays. Various types and quantities of dyes may be used to obtain virtually any desired ratio of image to stray light transmitted by the grooved block.

Hence, within the first azimuth the grooved plate slab 14 serves to effectively return the light rays directed from the source to the grooved surface and striking both sides of the dihedral reflector (providing for the sideways shift) in a manner analogous to a concave cylindrical mirror having its axis of curvature parallel to the axes of the grooves. The light diverges from and then converges to the origin within the first azimuth.

Within the first azimuth, the quantity of light reflected from the object point O to the image point I is referred to in terms of the f/aperture of the system in that azimuth. The f/aperture in the first azimuth would be analogous to the aperture of a concave cylindrical mirror as discussed above in which the axis of curvature of the cylindrical mirror was parallel to the axes of the grooves. The f/aperture in this first azimuth would be dependent upon the amount of internal reflection provided at the grooves 16 and the index of refraction of the block 14.

FIG. 5 illustrates the path of the light rays in the second azimuth which is perpendicular to the first azimuth as shown in FIG. 2. Within this second azimuth, the position of a light ray depends upon the principle of reflection and refraction. Thus focusing within this plane is accomplished by lenses, mirror and by the curvature of the longitudinal axes of the grooves themselves in planes parallel to the planes of the second azimuth. It is convenient to have the lens or mirror system in the second azimuth operating at a somewhat higher aperture than that of the first azimuth.

While the imaging in the first azimuth, by the V-grooved surface, will always be in a manner discussed above with reference to FIG. 2, the imaging in the second azimuth will vary, depending upon the particular arrangement of reflectors and lenses. Thus, while each of the embodiments of this invention, as shown in FIGS. 3, 4, 7 and 8 will control the light in the first azimuth in the manner shown in FIG. 2, each of these embodiments will control the light in the second azimuth in a different manner.

As discussed above, in order to provide a right-reading countercurrent scanner the optical system, in the second azimuth, must include one lens and one reflector or an even number of lenses and reflectors. Since this invention is directed primarily to an optical system for countercurrent right-reading scanning, each of the embodiments meets the above requirements. However, it is to be understood that it is within the scope of this invention to provide an odd number of reflectors and lenses giving a wrong-reading image in the second azimuth while retaining the V-grooved system discussed above for imaging in the first azimuth.

FIG. 3 shows an exploded view of the elements forming a first embodiment 3A of the invention. Here, imaging by the optical element 3A in the second azimuth is provided by a cylindrical lens 25 in series with a plate slab 24 having 90° V-grooves 20 identical to the grooves in the slab 14 of FIG. 2. The cylindrical lens 25 acts to collimate the light (in one azimuth) and then after reflection from slab 24 to focus this collimated light (in the same azimuth). In order to provide a right-reading image on the photosensitive paper 2, an even number of lenses and reflectors must be provided. In this regard the grooved surfaces act as two reflectors. Thus in the embodiment of FIG. 3 three reflectors and one lens are provided. Light reflected from the document 1 and entering the lens 3A at the entrance face 27 is reflected from the surface 26 through lens 25 to the V-grooves 20 and back through the lens 25 to the exit face 28 of the lens 3A and then to photosensitive paper 2 where an image of the information on document 1 is formed.

In a second embodiment of the invention as shown in FIGS. 4–6 lens 3B is formed of a unitary optical element. Imaging of information from the document 1 adjacent the entrance face 37, to photosensitive paper 2 adjacent the exist face 38 is achieved in the second azimuth in a manner as shown in FIG. 5. Light from a point O at the entrance face 37 is reflected by a reflecting surface 36 to the surface of the grooves 30. In this embodiment the axes of the grooves are carried about a cylinder in planes orthogonal to the cylindrical axis of the cylinder. In this embodiment the V-grooved surface not only controls light in the first azimuth but it also acts as a cylindrical reflector to focus light in the second azimuth. In order to provide the even number of reflectors and lenses in the second system, the curved grooved surface counts as one lens and two reflectors and the reflector 36 counts as one reflector.

In FIG. 5 the surfaces 39 are blackened to absorb stray light rays from the point O in the second azimuth.

The optical element 3B may have various relative dimensions and have any convenient index of refraction as long as they are all optically correlated. Suitable dimensions for the optical element of FIGS. 4 and 5 are shown in FIGS. 6a and 6b. The optical element 3B may be made of glass or clear poly-methyl-methacrylate resin or any other suitable transparent material. Relatively inexpensively, the optical element could be constructed of cast plastic.

Although the embodiments of both FIGS. 3 and 4 work satisfactorily, the cylindrical lens 25 of FIG. 3 introduces a variation in axial focal length for oblique rays and the curved grooved surface 30 of FIG. 4 causes a geometric error in the return of oblique light. An optimum design for obtaining maximum symmetrical resolution, and thereby combining the advantages of the embodiments of FIGS. 3 and 4, is shown in the third embodiment of the invention, in FIG. 7, in which 40 is a cylindrically curved ninety degree V-grooved surface similar to surface 30 of FIG. 5. In this third embodiment two cylindrical surfaces 45 effectively serve as a compound cylindrical lens receiving light from a plane reflecting surface 46. The total optimization of such a design is rather complex. There is a continuum of possible designs for such a system and the choice of the optimum design involves a consideration of numerous factors peculiar to each specific application. It should be clear that any of the embodiments of the invention shown in FIGS. 3, 4 and 7 may be employed in the copy machine shown in FIG. 1.

Figure 8:
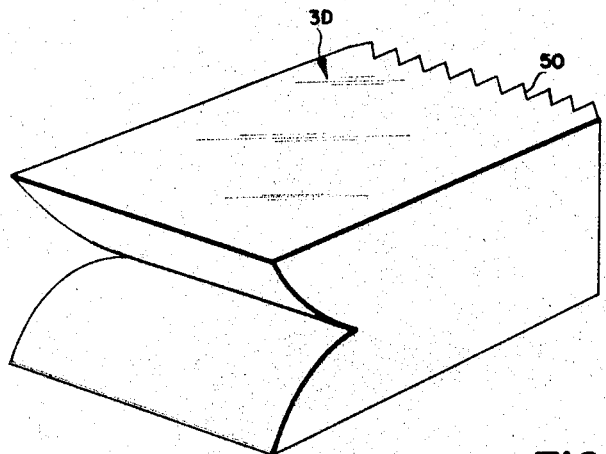
FIG. 8 is a perspective view of a fourth embodiment of the image forming element.
Figure 9:
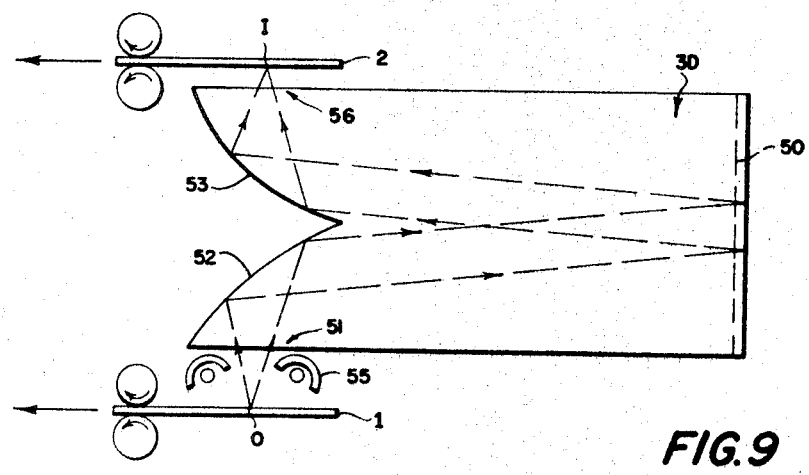
FIG. 9 is a side schematic view of the image forming element of FIG. 8 showing some ray traces therethrough.

FIGS. 8 and 9 illustrate another embodiment of the invention in which lens 3D combines flat grooves with reflectors (rather than a lens). In this embodiment light emanating from the object O on the document 1 and passing through the entrance face 51 of the lens 3D is reflected by the V-grooves 50 in the first azimuth in a manner as discussed above with reference to FIG. 2. In the second azimuth, as shown in FIG. 9, the light rays from light source 55 and reflected by document 1 enter the lens 3D at the entrance face 51. The rays are then reflected and collimated by curved reflector 52, reflected by the flat V-groove surface 50 towards curved reflector 53, and reflected and focused by 53 through the exit face 56 to the photosensitive paper 2. Where reflectors (other than the grooves themselves) rather than a lens are employed for focusing in the second azimuth one cannot use a single reflector since the system must operate at 1:1 ratio and therefore must have symmetrical optics. Accordingly, the present system employs four reflector surfaces 50 (2), 52 and 53 and one focuser 52 and 53 (in two parts, with collimated light between) and hence gives a wrong reading image on the paper at which the image is recorded. For instance FIG. 9 shows the optical element of FIG. 8 mounted between a document 1 and photosensitive paper 2. Co-current scanning may be provided by either holding element 3D stationary and moving 1 and 2 in parallel planes in the same direction, or by holding 1 and 2 stationary and moving element 3D (with the light source 55) therebetween.

In each of the above discussed embodiments illumination of the document may be provided by several possible methods. For instance, in the embodiments of FIGS. 3–7 the light may be provided in the large indented space behind the first reflector. Also, as shown in FIG. 9 a light may be immediately above the document surface adjacent the entrance face of the lens.

The maximum resolution of the present invention limited by diffraction and the groove width, is about 100 lines per inch. The light efficiency of the optical system can be relatively high, although of course reduction of stray light in the image area is accompanied by a reduction in imaging light efficiency.

The contrast of the optical image produced by the optical element 3 is comparable to that produced by a camera, rather than the low contrast produced by reflex printing. The use of a higher contrast optical image allows the use of photosensitive materials of lower contrast and produces better continuous tone reproduction. The fact that the light needed to illuminate the original does not pass through the photosensitive material 2, makes it possible to use a photosensitive material containing filter layers. Examples of such a material are the commercially available color reproducing materials.

The high light efficiency of the optical element allows a bright image of the original to be formed and allows a high rate of scanning. The light effieciency of the device can be increased by changing the index of refraction of the optical element. Likewise, a higher power light source would naturally also permit a high scanning rate.

From the foregoing description, it is apparent that the countercurrent scanner of FIG. 1 provides an image forming device which does not depend upon the ability of the object material to transmit light therethrough. The text to be copied is imaged by reflection directly from the surface of the object material and, consequently, text printed upon opaque material may be copied. In the event the object material is transparent or translucent, the light source for each of the above described embodiments may be positioned behind the object material.

Although there are specifically described above four embodiments which the present invention may assume in practice, it will be understood that these forms are shown for purposes of illustration only, and that the same may be modified and embodied in various other forms or employed in other uses without departing from the spirit or the scope of the invention, limited only by the appended claims.

I claim:

1. A duplicating apparatus for projecting information from a document to a sensitive sheet including an optical device for projecting light at 1:1 magnification from an object to an image plane comprising: an entrance face and an exit face and an optic axis extending therebetween, a first means for controlling light rays from the entrance face to the exit face in a first azimuth to form an image of the object at the image plane in the first azimuth, a second means for controlling light rays from the entrance face to the exit face in a second azimuth perpendicular to the first azimuth to form an image from the object to the image plane on the second azimuth, said first and second azimuths being orthogonal to the optic axis, and said first means including a reflecting surface extending perpendicular to the optic axis in the first azimuth and formed by a plurality of ninety degree V-grooves the longitudinally disecting planes of which are parallel to each other and parallel to the second azimuth and said second means comprising a cylindrical focusing device the cylindrical axis of which is perpendicular to the second azimuth and wherein document is positioned adjacent the entrance face and the sensitive paper is positioned adjacent the exit face.

2. A duplicating apparatus as claimed in claim 1 including a plane reflector mounted on the optic axis between the entrance face and the exit face to provide a right reading image, and the document and the sensitive paper are counetrcurrently scanned.

3. A duplicating apparatus as claimed in claim 1 including a light source positioned between the document and the sensitive sheet and mounted to transmit light to the document.

4. An optical device for imaging along an optical axis and the plane of an exit face at 1:1 magnification an image of an object positioned in the plane of an entrance face, comprising:

reflecting means comprising a plurality of surfaces arranged to form a plurality of straight 90° V-grooves, the longitudinally bisecting planes of which are parallel to each other and perpendicular to a first azimuth, said reflecting means being arranged relative to said optical axis and intermediate said entrance face and said exit face for forming an image of said object in the plane of said exit face in said first azimuth; and focusing means comprising a first cylindrical reflecting surface arranged relative to said optical axis between said entrance face and said reflecting means and a second cylindrical reflecting surface arranged relative to said optical axis between said reflecting means and said exit face, the cylindrical axes of said reflecting surfaces being perpendicular to a second azimuth that is perpendicular to said first azimuth, for forming an image of said object in the plane of said exit face in said second azimuth;

said first and second azimuths being orthogonal to said optical axis.

5. An optical device in accordance with claim 4 wherein the longitudinal axes of said V-grooves are curved in their respective bisecting planes and said focusing means comprises a cylindrical reflector formed by said V-grooves and a compound cylindrical lens having one portion thereof arranged between said entrance face and said reflecting means and another portion arranged between said reflecting means and said exit face.

6. An optical device in accordance with claim 5 wherein said V-grooves are formed on the surface of a solid block facing away from said entrance and exit faces and the surfaces of said V-groives are coated with a reflecting metallic material.

7. An optical device in accordance with claim 4 wherein the longitudinal axes of said V-grooves are curved in their respective bisecting planes and said focusing means comprises a plane reflector arranged relative to said optical axis between said entrance face and said reflecting means and a cylindrical reflector formed by said curved V-grooves and having its axis perpendicular to said second azimuth.

References Cited
UNITED STATES PATENTS

| | | | |
|---|---|---|---|
| 2,084,254 | 6/1937 | Hoal | 240—41.4 |
| 2,115,906 | 5/1938 | Dickson et al. | 350—109 X |
| 2,695,354 | 11/1954 | Neugass | 240—8.16 |

NORTON ANSHER, *Primary Examiner.*

WAYNE A. SIVERTSON, *Assistant Examiner.*

U.S. Cl. X.R.

355—66